Sept. 4, 1956 H. C. WINKEL 2,761,602
METHOD OF FEEDING BATTERY PLATE GRIDS TO A PASTING STATION
Filed Nov. 18, 1955 4 Sheets-Sheet 1

INVENTOR
HERBERT C. WINKEL
BY
ATTORNEY

Sept. 4, 1956  H. C. WINKEL  2,761,602
METHOD OF FEEDING BATTERY PLATE GRIDS TO A PASTING STATION
Filed Nov. 18, 1955  4 Sheets-Sheet 2

Inventor
HERBERT C. WINKEL
By
ATTORNEY

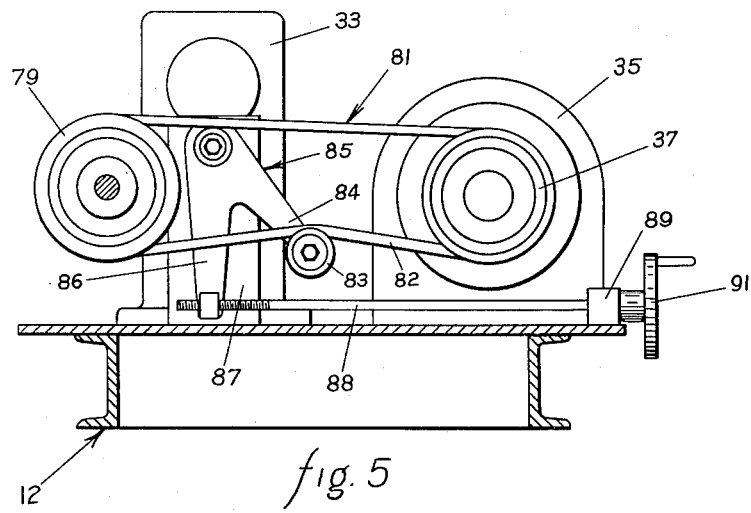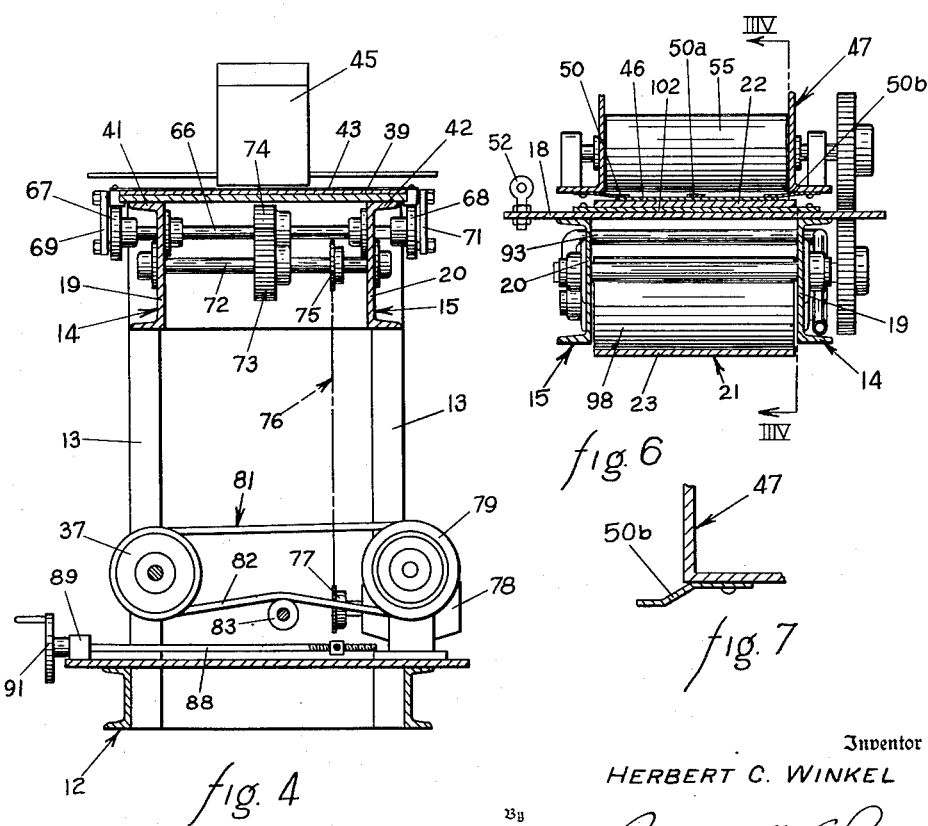

United States Patent Office 2,761,602
Patented Sept. 4, 1956

2,761,602

METHOD OF FEEDING BATTERY PLATE GRIDS TO A PASTING STATION

Herbert C. Winkel, Watervliet, Mich.

Application November 18, 1955, Serial No. 547,649

2 Claims. (Cl. 226—39.6)

This invention relates to an improved method for feeding battery plate grids to a pasting station for continuous paste application at said station and, more particularly, relates to a method whereby the battery grids can be fed from a stack to the pasting station in end-abutting-end relationship but with no end pressure between adjacent grids. This application is a continuation-in-part of application Serial No. 379,125, now abandoned, which in turn is a division of application Serial No. 103,634, now Patent No. 2,669,376.

In order to provide more satisfactory pasted battery grids, it is desirable that the grids be fed beneath the paste applying hopper in a steady continuous fashion and in precise alignment therewith. To obtain proper control over the feeding of the grids in a high speed operation, the grids should be positively driven from the moment they leave the stack until they depart from the hopper. Therefore, it is advantageous that the grids as they leave the stack be placed on a moving conveyor belt. When the conveyor belt with the grids thereon passes beneath the paste applying hopper, adjacent grids should be in end-abutting-end relationship so that paste will not be deposited on the belt or on the other parts of the machine, in order to avoid loss of paste and to prevent unsightly and unclean conditions around the machine. However, there must be little or no pressure on the ends of the grids during the feeding thereof to the paste applying hopper because such end pressure will tend to cause buckling of the relatively fragile grids. Accordingly, in order to provide a proper feeding of the grids to the pasting station it is necessary that they be fed onto the conveyor in end-abutting-end relationship but with adjacent grids exerting no end pressure on each other.

In the normal operation of conventional grid pasting machines, it has not been possible to achieve the desired condition of the grids as they are fed to the paste applying hopper. Thus, it has been found that the varying consistency of the paste being handled in some types of feeding methods places varying power requirements on the paste applying mechanism and on the continuously moving conveyor. This, in turn, results in variations in the spacing of the grids on the conveyor and in some instances results in sufficient end pressure between adjacent grids to cause buckling thereof. This problem arises from the fact that the conveyor moves the grids through the paste, and below the paste applicators at the lower end of a hopper, and the ease of such movement is often directly dependent upon the consistency of the paste. The paste responds quite materially to changes in humidity of the ambient atmosphere, even varying during a single day, and hence a given machine adjustment for a particular paste condition will not give the desired operation where the condition of the paste changes. In other types of feeding methods where the feeding adjustment is not sensitive to the consistency of the paste, there is no mechanical flexibility, or yieldability, and hence the adjustment must be perfect to accomplish both requirements of (1) no space between grids being pasted and (2) substantially no pressure between said grids. This has previously been impossible to attain.

Hence, the art has either accepted some spacing between the grids, with consequent loss of paste, or has accepted pasting machines involving other than belt conveyor construction and usually much more complicated.

Accordingly, it is a principal object of this invention to provide an improved method of feeding battery plate grids to a pasting station.

It is a further object of this invention to provide an improved method of feeding battery plate grids, as aforesaid, wherein the grids are fed to the paste applying station in end-abutting-end relationship.

It is a further object of this invention to provide an improved method of feeding battery plate grids, as aforesaid, wherein adjacent grids are moved to and through the pasting station with no appreciable end pressure therebetween.

In general, the method of this invention involves the steps of supplying grids from a stack onto a conveyor belt, which belt is moving at a steady speed, at a point on the belt spaced from the paste applying station. The grids are supplied to the belt by means operating at a rate which would tend to feed the plates at a rate slightly more rapid than the rate at which the belt can take them away and the driving means feeding the grids is allowed to slip when the grid being fed abuts against the previously fed grid with a predetermined, but light, end pressure. Thus, adjacent grids on said belt will be in end-abutting-end relationship with a pressure therebetween not greater than said predetermined end pressure as they pass beneath the paste applying hopper.

The accompanying drawings disclose one form of apparatus capable of carrying out the invention. A detailed description of this apparatus will be given to illustrate one mechanism by which the method may be performed.

In the drawings:

Figure 4 is a sectional view taken along the line IV—IV of Figure 2.

Figure 5 is a sectional view taken along the line V—V of Figure 2.

Figure 6 is a sectional view substantially as taken along the line VI—VI of Figure 3.

Figure 7 is a fragmentary, enlarged view of a portion of Figure 6.

Construction

Figure 1:
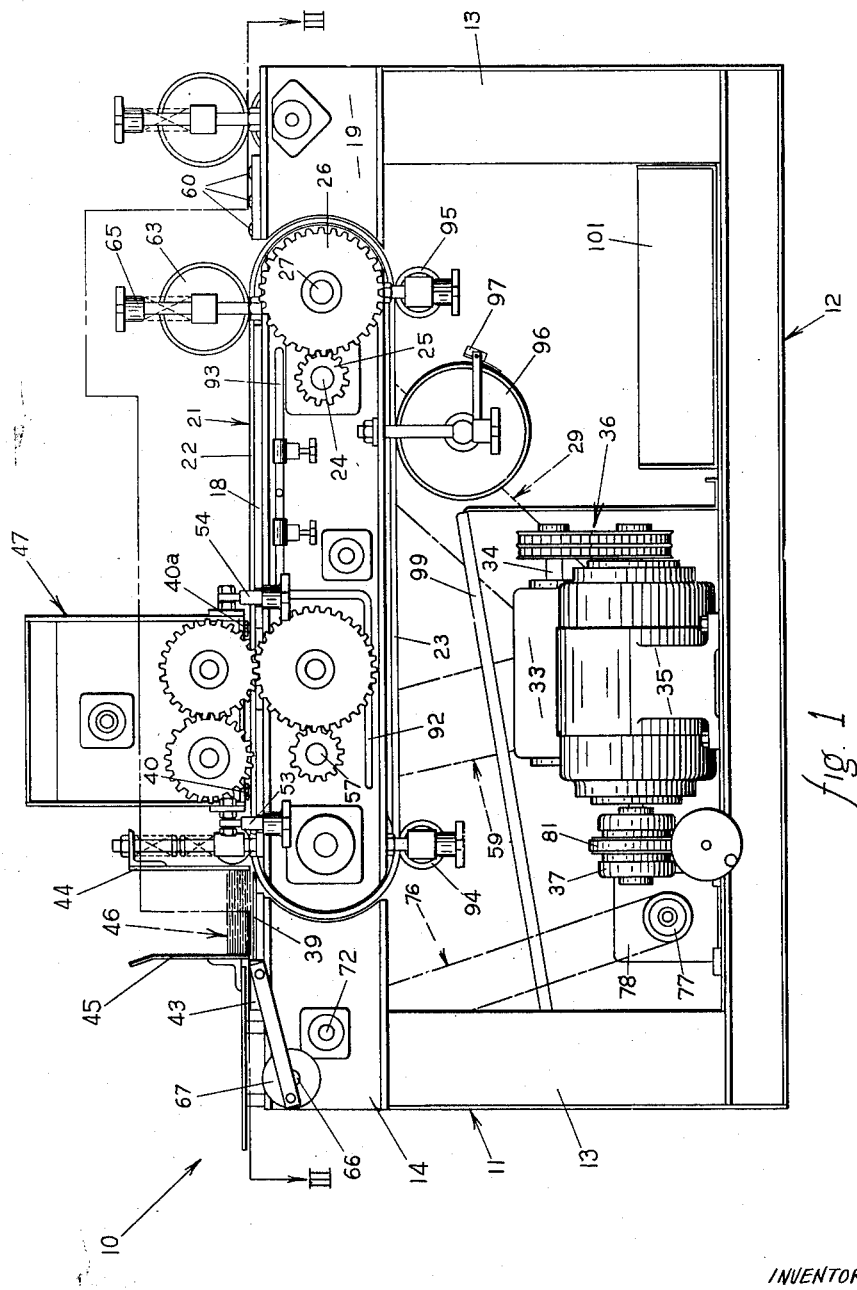
Figure 1 is a broken front elevation view of my improved automatic grid pasting machine.
Figure 2:
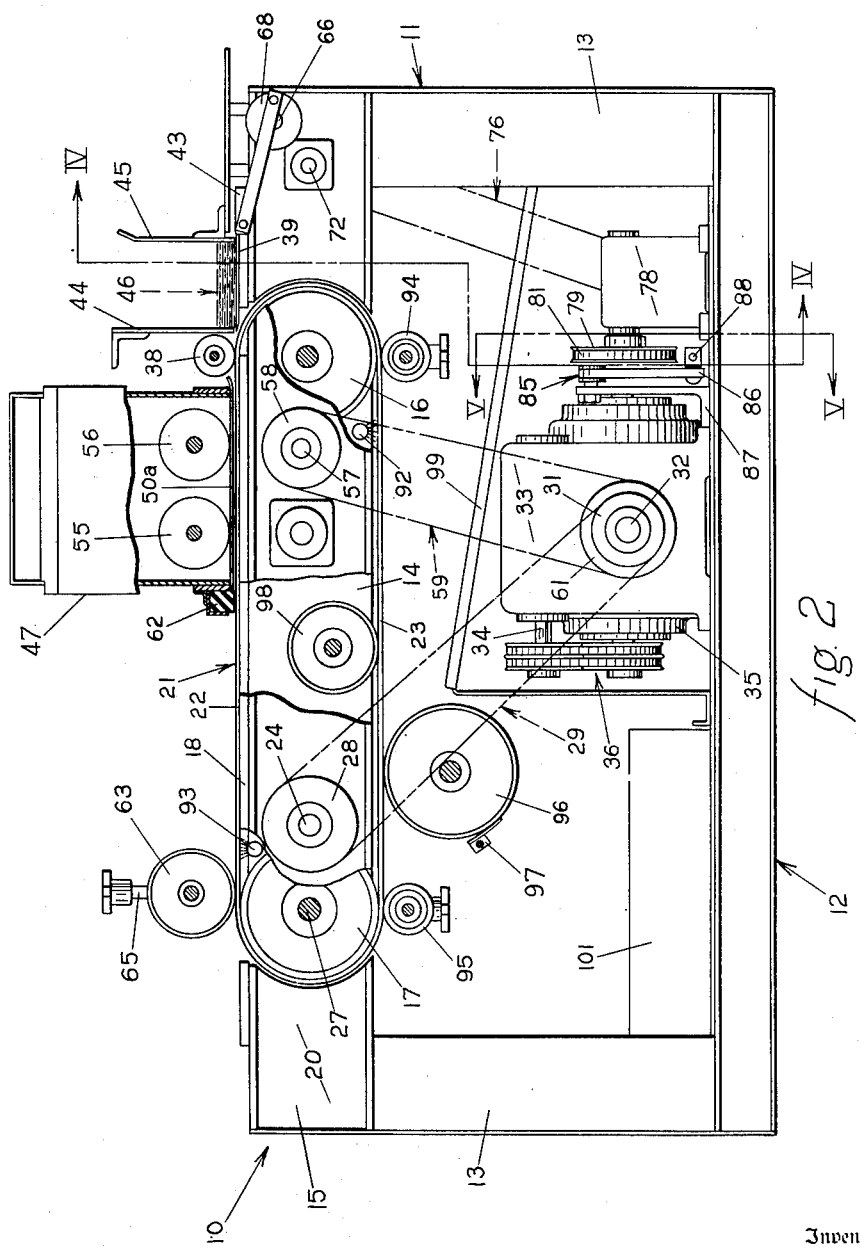
Figure 2 is a broken rear elevation view of my grid pasting machine.

As shown in Figures 1, 2 and 4, the grid pasting machine 10 is comprised of a frame 11 having a base 12, a plurality, such as four, of upstanding legs 13 supported upon and secured at their lower ends to said base. A pair of spaced, parallel channel-shaped beams 14 and 15 are secured to and supported upon the upper ends of the legs 13 so that the webs 19 and 20 thereof are substantially parallel and the flanges thereof extend in opposite directions.

Figure 3:
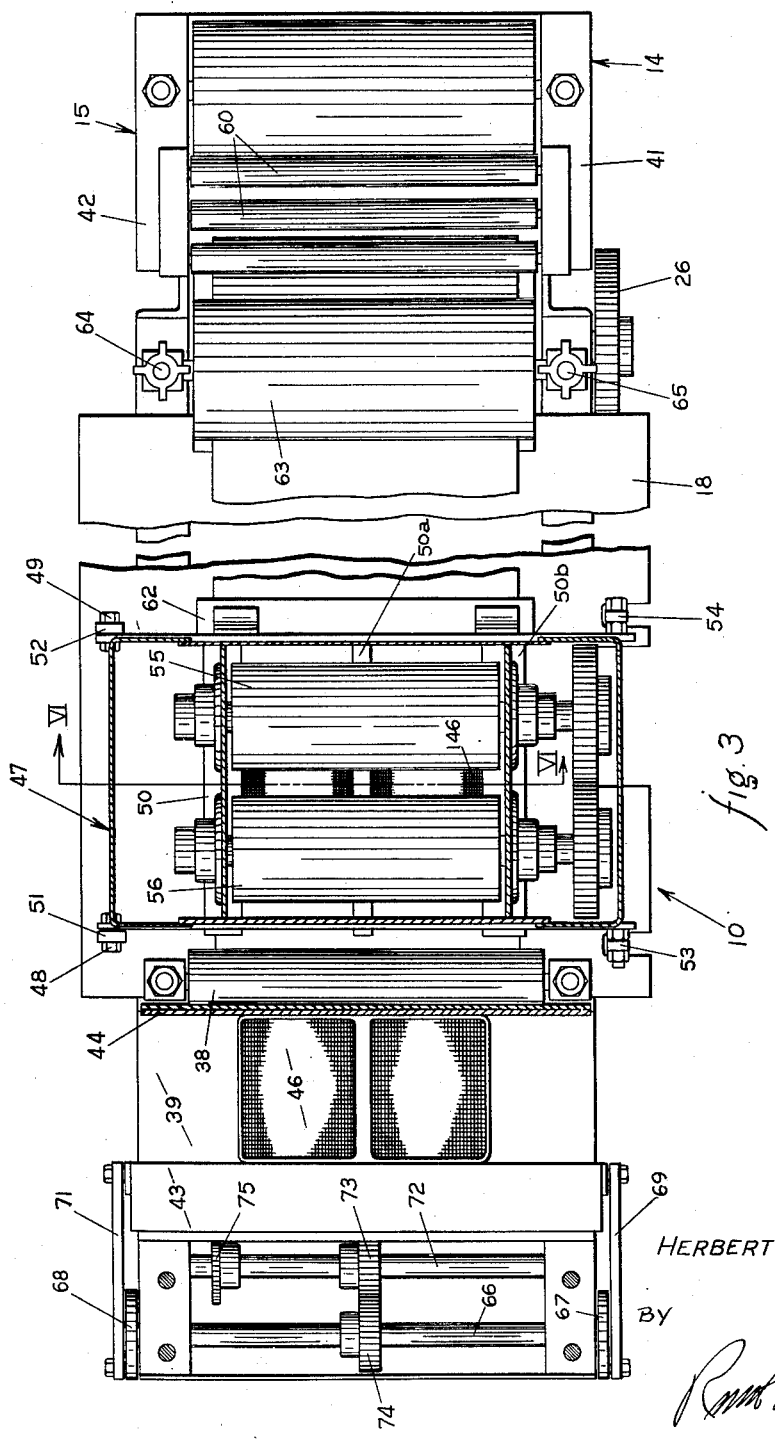
Figure 3 is a broken sectional view taken along the line III—III of Figure 1.

For the purpose of convenience in description the terms "leading" and "trailing" as used in this specification shall be understood to have reference to the leftward and rightward ends of the grid pasting machine 10, respectively, as appearing in Figures 1 and 3. The terms "upper" and "lower" shall be understood to refer to the device when positioned and/or operating in its normal manner of use.

A pair of parallel, horizontally spaced belt drums (Figure 2) hereinafter referred to as the leading drum 16 and trailing drum 17, are rotatably supported upon and between the webs 19 and 20 of the channel beams 14 and 15, respectively, near the leading and trailing ends thereof, respectively.

A belt support plate 18 is secured to and upon the upper flanges 41 and 42 of the channel beams 14 and 15, respectively, between the drums 16 and 17. The drums are preferably so mounted upon the beams 14 and 15 that they are tangent with the plane defined by the upper surface of the belt plate 18. An endless conveyor belt 21 which extends tightly around both the leading and trailing drums 16 and 17, respectively, has an upper reach 22, which is supported upon the belt plate 18, and a lower reach 23. The conveyor belt 21 is preferably, but it is not necessarily, fabricated from a tightly woven, textile fabric in a conventional manner and, therefore, is reasonably stiff. Accordingly, the drums 17 and 16 must be sufficiently large in diameter to permit turning of the belt 21 therearound without subjecting the belt to undue bending strains.

It will be noted that the drums must further be of sufficiently large diameter that there will be no perceptible tendency for the outer surface of the belt to creep with respect to the inner surface of the belt as said belt moves around the drums. Such creeping produces an action which tends to damage the pasted grid.

A drum jack shaft 24 (Figures 1 and 2) is rotatably supported upon and between the webs 19 and 20 parallel with and adjacent to the trailing drum 17. A drum driving gear 25, which is secured to that end of the jack shaft 24 extending through the web 19, engages and drives the drum driven gear 26, which is secured to the trailing drum shaft 27, whereby the trailing drum 17 may be rotated.

A sprocket 28 (Figure 2), which is secured to that end of the drum jack shaft 24 extending through and beyond the web 20, is operably engaged by a drum chain 29 which in turn engages the gear box driven sprocket 31. This driven sprocket 31 is mounted upon and secured to the driven sprocket shaft 32 of the drum gear box 33. The gear box 33 is preferably positioned upon the base 12 so that the driven sprocket 31 (Figure 2) is properly aligned with the jack shaft sprocket 28. The driving shaft 34 of the gear box 33 is driven by suitable constant speed means, such as the electric induction motor 35 (Figure 1), which is positioned adjacent to the gear box 33 on the base 12, by means of a conventional pulley and belt assembly 36. The electric motor 35 is preferably of the type having a shaft extension from both axial ends thereof, and a variable pitch pulley 37 of a conventional type is mounted on that shaft extension of the motor 35 remote from the pulley and belt assembly 36.

A pressure roll 38, which may be fabricated with a rubber covering, is vertically adjustably and resiliently mounted upon the belt plate 18 at the leading end thereof so that it is axially parallel with the leading drum 16 and vertically aligned therewith. The pressure roll 38 is resiliently pressed against and rotates with the conveyor belt 21 for the purpose of holding a grid thereagainst as it moves thereon.

A grid supporting platform 39 is supported upon the flanges 41 and 42 of the channel beams 14 and 15, respectively, adjacent to the leading end of the upper reach 22 of the conveyor belt 21 so that the upper surface of the grid supporting platform 39 is substantially coplanar with the upper surface of the upper reach 22. A grid feed bar or shuttle 43, which is perpendicularly disposed with respect to the beams 14 and 15, is slidably supported upon the grid supporting platform 39 for reciprocable movement toward and away from the leading end of the belt upper reach 22.

A fixed, vertical, grid guide plate 44 is supported upon the belt plate 18 on that side of the pressure roll 38 adjacent to the grid supporting platform 39. An adjustable, vertical grid guide plate 45 is supported upon the upper flanges 41 and 42 between the fixed guide plate 44 and the leading ends of the beams 14 and 15 for movement toward and away from the fixed guide plate 44. The fixed guide plate 44 and the adjustable guide plate 45 are so disposed with respect to each other that a plurality of battery grids 46 can be placed in a pile between the plates 44 and 45 upon the grid platform 39. The lower edge of the fixed guide plate 44 is preferably spaced above the plane of the upper surface of the grid supporting platform 39 so that the grid feed bar or shuttle 43 can advance one battery grid 46 at a time from the platform 39 onto the upper reach 22 of the conveyor belt 21 beneath the lower edge of the fixed guide plate 44.

A paste hopper 47 (Figure 3) is hingedly and vertically adjustably supported upon the belt plate adjacent to the pressure roll 38, and is spaced above the upper reach 22 of the conveyor belt 21 so that a battery grid 46 may be conveyed on said upper reach 22 beneath the paste hopper 47. The paste hopper 47 is hinged upon the belt plate 18 adjacent to the channel beam 15 by means of the hinge bolts 48 and 49 and the hinge posts 51 and 52. Both hinge posts are mounted upon the belt plate 18 for vertical adjustment with respect thereto. The opposite side of the hopper 47 is securable to the belt plate 18 by means of the toggle bolt clamps 53 and 54 adjacent to the channel beam 14. A pair of vertically adjustable hopper support bolts 40 and 40a (Figure 1), are threadedly secured to the top of the belt plate 18 for engaging and supporting that side of the hopper 47 to which the toggle bolts 53 and 54 are secured. Thus, the vertical position of the hopper 47 with respect to the belt 21 can be varied within limits by appropriate vertical adjustment of the hopper support bolts 40 and 40a and the hinge posts 51 and 52.

A pair of parallel, horizontally spaced mixing rolls 55 and 56 (Figure 2), which are preferably axially parallel with each other and with the pressure roll 38, are rotatably supported within the paste hopper 47. A hopper jack shaft 57, which is rotatably supported upon and between the webs 19 and 20, is substantially, axially parallel with said mixing rolls. The mixing rolls 55 and 56 are geared to each other, as well as to that end of the hopper jack shaft 57 extending through the web 19, by means of appropriate interengaging gears. A hopper sprocket 58, which is supported upon and rotatable with that end of the hopper jack shaft 57 extending through the web 20, is engaged by a hopper chain 59 which in turn engages and is driven by the driven sprocket 61. The sprocket 61 is mounted upon the driven sprocket shaft 32 of the gear box 33, adjacent to the gear box driven sprocket 31.

A plurality, here three, of flexible, paste control strips 50, 50a and 50b (Figures 2, 3, 6 and 7) which are parallel with each other as well as with the beams 14 and 15, are adjustably and removably secured to the bottom of the paste hopper 47 across the opening therethrough and adjacent to the upper reach 22 of the belt 21. These flexible strips guide the paste into the interstices in the grids and positively prevent contamination of the lugs protruding outside the pasting area, as the grids pass beneath the hopper 47. The strips 50, 50a and 50b, as shown in Figure 2 with respect to strip 50a and in Figure 7 with respect to the strip 50b, are shaped to permit a substantial range of vertical flexion. Thus, the strips can maintain control of the paste flow from the hopper onto grids of varying thicknesses without necessitating vertical adjustment of the hopper 47.

A feed bar actuating shaft 66 (Figures 2, 3 and 4) is rotatably supported upon and between the webs 19 and 20 adjacent to the leading ends thereof so that it is substantially axially parallel with the leading drum 16, and so that it extends through both of the said webs. A pair of feed bar actuating disks 67 and 68 are secured to and rotatable with the extended ends of the feed bar actuating shaft 66. A pair of connecting rods 69 and 71 are pivotally secured at one end of each, respectively, to the feed bar actuating disks 67 and 68 near the perimeters thereof. The other ends of the connecting rods 69 and 71 are pivotally secured to the opposite lateral ends, respectively, of the grid feed bar 43. Thus, rotation of the actuating disks 67 and 68 is translated into reciprocable motion of the feed bar 43 along the grid support platform 39 by means of the connecting rods 69 and 71.

A feed bar jack shaft 72 (Figures 2, 3 and 4) is rotatably supported upon and between the leading ends of the webs 19 and 20 adjacent to, and preferably parallel with, the feed bar actuating shaft 66. A gear 73 mounted upon and rotatable with the feed bar jack shaft 72 engages a gear 74 mounted upon and rotatable with the feed bar actuating shaft 66 for the purpose of driving same.

A feed bar sprocket 75 (Figures 3 and 4), which is mounted upon and rotatable with the feed bar jack shaft 72, is engaged by a feed bar chain 76 which also engages the gear box sprocket 77 which is rotatably supported upon and by the feed bar gear box 78. The feed bar gear box 78 is mounted upon the platform base 12 near the drum gear box 33 and rotatably supports a gear box pulley 79 which is axialy aligned with the variable pitch pulley 37 mounted on the motor 35. The sprockets 77 or 75 are provided with any conventional slip clutch for preventing damage to the grid feed bar 43 and associated mechanism in the event that the grids contact each other during advancement from the grid platform 39 onto the belt 21 or thereafter.

The gear box pulley 79 and variable pitch pulley 37 are mutually engaged by an appropriate pulley belt 81 (Figure 5). The lower reach 82 of the pulley belt 81 is rotatably engaged by an adjustment pulley 83 which is rotatably supported upon the free end of the pulley arm 84 of the pitch adjusting fork 85. That end of the pulley arm 84 remote from the adjustment pulley 83 is joined by, and preferably integral with, an adjustment arm 86 which is preferably, but not necessarily, disposed at an angle of aproximately 35 degrees to the said pulley arm. The pitch adjusting fork 85 is pivotally supported at the junction of the pulley and adjustment arms upon a support bracket 87 (Figure 2), which is mounted upon and secured to the platform base 12 approximately between the gear box 33 and the gear box 78.

The pitch adjusting fork 85 is normally positioned so that the pulley and adjustment arms 84 and 86, respectively, are substantially below the pivot point of the pitch adjusting fork 85 upon the support bracket 87. The free end of the adjustment arm 86, remote from the said pivot point, is threadedly engaged by a substantially horizontal adjustment rod 88 which is preferably rotatably supported upon the platform base 12 by means of the rod support post 89. The adjustment pulley, hence the pulley arm 84, is preferably disposed between the adjustment arm 86 and the support post 89.

That end of the adjustment rod 88, remote from the end thereof engaged by the adjustment arm 86, is engaged by and secured to a crank 91 of any convenient, conventional type. Accordingly, rotation of the adjustment rod 88 by means of the crank 91 causes the pitch adjusting fork 85 to pivot upon the support bracket 87 toward or away from the rod support post 89. Such pivotal movement of the pitch adjusting fork 85 effects a generally upward or downward movement of the adjustment pulley 83 with respect to the platform base 12 and the lower reach 82 of the pulley belt 81 with which said pulley 83 is engageable. Such movement of the adjustment pulley 83 tends to change the effective length of the belt 81 which in turn results in a comparable change in the pitch diameter of the variable pitch pulley 37 within standard, conventional limitations.

A pair of pressure rolls 94 and 95 (Figures 1 and 2) are rotatably supported below and against the leading and trailing ends, respectively, of the lower reach 23 of the conveyor belt 21. The pressure roll 94 is axially aligned with and disposed vertically below the leading drum 16 and the pressure roll 95 is axially parallel with and disposed vertically below the trailing drum 17.

A belt tightening roll 96 is rotatably supported upon and below the beams 14 and 15 so that it is axially aligned with and near to the trailing drum 17 and engages the lower surface of the lower reach 23 of the conveyor belt 21 intermediate the leading and trailing ends thereof. The tightening roll 96 is vertically adjustable so that upward movement thereof causes the conveyor belt 21 to be stretched more tightly around the drums 16 and 17. A tightening roll wiper 97 is supported adjacent to the tightening roll 96 for sweeping the surface thereof as said tightening roll is rotated as a result of its contact with the lower reach 23 of the conveyor belt 21. Thus, any moisture and/or paste removed by said tightening roll 96 from the conveyor belt 21 is removed from the tightening roll 96 by the wiper 97. An idling roll 98 is rotatably supported upon and between the webs 19 and 20 approximately midway between the leading drum 16 and the trailing drum 17 for engaging the upper surface of the lower reach 23 of the conveyor belt 21. The idling roll 98 assists in controlling the movement of the lower reach 23 and assists the tightening roll 96 in effecting control of the tightness of the conveyor belt 21.

A drain trough 99 and drain pan 101 are provided within the frame 11 between the platform base 12 and the channel beams 14 and 15 for the purpose of catching and collecting both moisture and excess paste removed from the conveyor belt 21 as said conveyor belt passes between the trailing drum 17 and the leading drum 16.

A belt shim 102 (Figure 6), which may be fabricated from metal plate, may be secured to the top of the belt plate 18 substantially throughout the length and width thereof for raising the level of the upper reach 22 of the belt 21 when it becomes desirable to paste grids of thickness less than the range of grid thickness to which the pasting machine is normally adaptable without changing the vertical adjustment of the hinge posts 51 and 52 and the hopper support bolts 40 and 40a.

*Operation*

As shown in Figures 1, 2 and 5, energization of the motor 35 effects a constant speed actuation of the gear box 33 through the pulley and belt assembly 36 and an adjustable speed actuation of the gear box 78 through the pulley belt 81. The trailing, or driving, drum 17 is rotated at a constant speed by the gear box 33 through the driven sprocket 31, the chain 29, the sprocket 28 and the jack shaft 24. Such rotation of the trailing drum 17 effects rotation of both the conveyor belt 21 and the leading drum 16.

Actuation of the gear box 33 also effects rotation of the mixing rolls 55 and 56 in the paste hopper 47 (Figure 2) through the sprocket 61, the chain 59, the sprocket 58 and the appropriate interengagement of gears associated with the mixing rolls 55 and 56 and the jack shaft 57.

In synchronization with the rotation of the mixing rolls 55 and 56 and rotation of the conveyor belt 21, the feed bar gear box 78 effects reciprocable motion of the grid feed bar or shuttle 43 from the sprocket 77, through the chain 76, the sprocket 75, the gears 73 and 74, the jack shaft 72, the actuating shaft 66, the actuating disks 67 and 68, and the connecting rods 69 and 71. The paste hopper 47 may be provided with a mixing paddle or other means, not shown, in any conventional manner, for keeping the paste within the said paste hopper in continuous agitation.

Accordingly, as the conveyor belt 21 moves around the drums 16 and 17 the grid feed bar 43 advances one grid 46 at a time from its position upon the grid supporting platform 39 onto the leading end of the upper reach 22 of the conveyor belt 21. The grid is conveyed by the belt 21 beneath both the lower edge of the fixed guide plate 44 and the pressure roll 38. The conveyor belt 21 then moves the battery grid 46 under the paste hopper 47 (Figure 3) where the mixing rolls 55 and 56 squeeze the paste onto the interstices in the grid 46. As the pasted grid passes under the trailing end of the paste hopper 47, the squeegee bar 62 secured thereto wipes the excess paste from the upper surface of the grid. The conveyor belt 21 moves the pasted grid until it passes under the flattening roll 63 where it is thereafter released from the upper reach 22 onto any convenient, conventional means, such as the conveyor rolls 60.

With the flattening roll 63 preventing the arching of the conveyor belt immediately ahead of the trailing roll 17, and also assuming the clean and positive separation of the grid from the belt, there is substantially less paste pulled from the grid by and onto the belt than when such roll is not used. Its pressure should be only sufficient to prevent the said arching and thereby confining that portion of the upper reach of the belt 21 conveying pasted grids to a substantially unbroken plane up to the point that it actually commences to turn around the trailing roll 17.

The flexible paste control strips 50, 50a and 50b adjustably secured to the bottom of the hopper 47 control the application of the paste to the grid as it passes beneath the paste hopper 47. However, the spacing of one grid with respect to an adjacent grid as said grids are advanced from the grid platform 39 onto the conveyor belt 21 is controlled by the speed of reciprocation of the feed bar 43 with respect to the lineal speed of the conveyor belt 21. The lineal speed of the conveyor belt being constant in this embodiment, such spacing is varied by adjusting the speed of reciprocating of said feed bar 43. This is accomplished by adjustment of the vertical position of the adjustment pulley 83.

The spacing between the individual grids upon the conveyor belt 21 can thus be increased or decreased, respectively, by moving the pulley 83 upwardly or downwardly, which results in slowing down or speeding up the grid bar gear box 78. Thus, as shown in Figure 5, if it becomes desirable to reduce the spacing between the individual grids upon the conveyor belt 21, the crank 91 on the adjustment rod 88 is rotated in the appropriate direction so that the adjustment pulley 83 is lowered, thereby increasing the pitch diameter of the variable pitch pulley 37 which in turn effects a speed-up of the feed gear box 78, thereby increasing the speed of reciprocation of the grid feed bar 43. The space between the individual grids is increased by rotating the crank 91 in the opposite direction.

In normal use, it is impossible to adjust the speed of operation of the shuttle so that the grids are consistently fed in exactly end-abutting-end relationship and, even if this were possible, it would be impractical to readjust the speed of the grid bar gear box 78 for each change in operating conditions. Therefore, where the grids are to be fed in end-abutting-end relationship, the speed of the grid bar gear box 78 is so controlled that it causes the feed bar 43 to supply grids to the conveyor belt 21 at a rate which tends to be slightly greater than the rate at wihch the belt can take them away. When a grid is fed in this manner, as soon as it abuts against the end of the previously fed grid and a predetermined end pressure exists between the grids, the slip clutch will slip and relieve the force acting on the feed bar 43 from the power source so that it will not drive the grids further until the end pressure drops below the pressure at which the clutch is set to slip. In actual use, the slippage of the clutch in conjunction with the action of conveyor belt 21 will maintain the grids in abutting contact but will avoid the occurrence of any appreciable end pressure between adjacent grids. Thus, the adjacent grids will be in end-abutting-end relationship but there will be no appreciable end pressure between the adjacent grids as the grids move with the conveyor belt 21.

It will be observed that the means, including the pitch adjusting fork 85 and its associated parts, whereby the spacing between individual grids on the conveyor belt 21 may be controlled, is so constructed that the change in spacing can be effected while the machine is in operation.

Since the length, hence the tightness of the conveyor belt 21 will vary both with use and with variation in moisture content, the tightening roll 96 is also mounted for adjustment while the belt 21 is moving.

The adjustable guide plate 45 can be moved toward and away from the fixed guide plate 44, within limitations, for adaptation to battery grids of various sizes. Likewise the paste control strips 50, 50a and 50b under the paste hopper 47 can also be either adjusted or replaced to meet the requirements for various sizes of grids.

While the foregoing described embodiment provides for adjustment of the speed of the grid feeding shuttle, it will be obvious in view of the foregoing that such adjustment may also be placed on the conveyor driving means.

Although the above mentioned drawings and description relate to one particular apparatus for performing the method of this invention, it is to be understood that this description is given for illustrative purposes only and that the method can be performed using other apparatuses known in this art.

Accordingly a process capable of meeting the objects and purposes above set forth has been disclosed. It is to be understood that the steps of the process may be varied within limits and the appended claims are to be interpreted as covering such variations unless these claims by their express terms require otherwise.

I claim:

1. A method for feeding and applying paste to battery plate grids, comprising the steps: moving a belt at a steady rate in a substantially horizontal plane to and through a pasting station; supplying said grids successively from a stack to said belt at a point thereon spaced from said station; controlling the rate of supplying grids to the belt independently of the rate of movement of said belt; feeding said grids to said belt at a rate slightly more rapidly than the belt can take them away; effecting a slippage in the feeding means when the ends of said adjacent grids abut to feed said grids onto said belt in exactly end-abutting-end relationship with insufficient end pressure between adjacent grids to cause buckling of said grids; and continuously applying paste to said grids as they pass said station.

2. A method for feeding battery plate grids to a pasting station, said grids being of limited mechanical strength and subject to buckling upon the imposition of a predetermined end pressure, comprising the steps: moving a belt at a steady rate in a substantially horizontal plane to and through said station; supplying grids successively from a stack to said belt; adjusting the rate of supplying said grids independently of the rate of movement of said belt; feeding said grids to said belt at a rate slightly more rapidly than said belt can take them away, whereby adjacent grids abut and tend to exert end pressure on each other in an amount greater than said predetermined pressure; relieving the pressure applied to the rearward one of said adjacent grids sufficiently that the actual end pressure between adjacent grids is held to a value materially less than said predetermined pressure; and forwarding said grids in end-abutting-end relationship through said pasting station.

References Cited in the file of this patent

UNITED STATES PATENTS

| | | |
|---|---|---|
| 704,434 | Chevalier et al. | July 8, 1902 |
| 1,117,341 | Cross | Nov. 17, 1914 |
| 1,272,608 | Bleile | July 16, 1918 |

(Other references on following page)

UNITED STATES PATENTS

| | | |
|---|---|---|
| 1,560,373 | Birnstock | Nov. 3, 1925 |
| 1,613,521 | Martin | Jan. 4, 1927 |
| 1,627,764 | Angell | May 10, 1927 |
| 1,975,039 | Goodrich et al. | Sept. 25, 1934 |
| 2,107,733 | Henry | Feb. 8, 1938 |
| 2,134,159 | Von Hofe | Oct. 25, 1938 |
| 2,195,160 | Yerkey | Mar. 26, 1940 |
| 2,215,438 | Radle | Sept. 17, 1940 |
| 2,016,085 | Fawkes et al. | Oct. 26, 1940 |
| 2,308,589 | Davis | Jan. 19, 1943 |
| 2,516,821 | Wright | July 25, 1950 |
| 2,669,376 | Winkel | Feb. 16, 1954 |